United States Patent
Porter et al.

(10) Patent No.: US 11,447,218 B2
(45) Date of Patent: Sep. 20, 2022

(54) DYNAMIC BUOYANCY CONTROL

(71) Applicant: L3 Open Water Power, Inc., Somerville, MA (US)

(72) Inventors: David Harvie Porter, Somerville, MA (US); Thomas Bradford Milnes, Beverly, MA (US); Ian Salmon McKay, Seattle, WA (US); Jeffrey Michael Smith, Pembroke, MA (US)

(73) Assignee: L3Harris Open Water Power, Inc., Somerville, MA (US)

( * ) Notice: Subject to any disclaimer, the term of this patent is extended or adjusted under 35 U.S.C. 154(b) by 326 days.

(21) Appl. No.: 16/338,989

(22) PCT Filed: Oct. 4, 2017

(86) PCT No.: PCT/US2017/055196
§ 371 (c)(1),
(2) Date: Apr. 2, 2019

(87) PCT Pub. No.: WO2018/067738
PCT Pub. Date: Apr. 12, 2018

(65) Prior Publication Data
US 2021/0214062 A1 Jul. 15, 2021

Related U.S. Application Data

(60) Provisional application No. 62/404,194, filed on Oct. 4, 2016.

(51) Int. Cl.
*B63G 8/22* (2006.01)
*H01M 50/60* (2021.01)
*B63G 8/24* (2006.01)
*H01M 8/0606* (2016.01)
*H01M 12/04* (2006.01)

(52) U.S. Cl.
CPC .............. *B63G 8/22* (2013.01); *B63G 8/24* (2013.01); *H01M 8/0606* (2013.01); *H01M 12/04* (2013.01); *H01M 50/60* (2021.01)

(58) Field of Classification Search
CPC .. B63G 8/00; B63G 8/22; B63G 8/24; H01M 50/60; H01M 8/0606; H01M 12/04
See application file for complete search history.

(56) References Cited

U.S. PATENT DOCUMENTS

| | | | |
|---|---|---|---|
| 3,379,156 A | 4/1968 | Keays et al. | |
| 6,371,041 B1* | 4/2002 | Ness | B63G 8/22 114/333 |
| 2007/0186837 A1 | 8/2007 | Bagley et al. | |
| 2014/0154595 A1 | 6/2014 | McKay et al. | |

OTHER PUBLICATIONS

International search report for PCT/US2017/055196, dated Jan. 5, 2017, 2 pages.
Written opinion for PCT/US2017/055196, dated Jan. 5, 2017, 6 pages.

* cited by examiner

*Primary Examiner* — Stephen P Avila
(74) *Attorney, Agent, or Firm* — Danielson Legal LLC (57) ABSTRACT

Underwater apparatuses and methods of operating underwater apparatuses. The apparatus includes a power source such as an aluminum-water cell. Waste product from the power source may be channeled into various portions of the apparatus to adjust the buoyancy of the apparatus, the center of buoyancy of the apparatus, and/or the trim of the apparatus.

20 Claims, 4 Drawing Sheets

DYNAMIC BUOYANCY CONTROL

CROSS REFERENCE TO RELATED APPLICATIONS

The present application is a national phase application of International (PCT) Patent Appl. No. PCT/US2017/055196, filed internationally on Oct. 4, 2017, and claims the benefit of and priority to U.S. Provisional Appl. No. 62/404,194, filed on Oct. 4, 2016, the entire disclosure of each of which is hereby incorporated by reference as if set forth in their entirety herein.

TECHNICAL FIELD

Embodiments described herein generally relate to underwater apparatuses and methods of operating underwater apparatuses, and more specifically to buoyancy adjustment using waste products from power systems.

BACKGROUND

Underwater apparatuses such as underwater vehicles or the like need to manage buoyancy and trim to control their trajectory. Buoyancy must be controlled to, for example, maintain a certain depth, to ascend, or to descend.

Together, trim and buoyancy control allow vehicles to create forward velocity using glider-based principles. For example, while ascending or descending, a control surface or surface can be positioned at an angle to create thrust in a certain direction.

In addition to vehicles, other types of devices also need to manage buoyancy for operation. For example, debris sensor/recovery systems may need to travel to some depth, gather debris or imagery, and then rise back up to the surface. Other types of devices that need to manage their buoyancy include devices for gathering imagery of an underwater environment.

Existing techniques for controlling buoyancy can be classified into several groups. Stored compressed gas systems carry a compressed gas and utilize the gas to displace water in a buoyancy chamber. This technique requires little energy from the system. However, these types of vehicles or devices have a limited operational life that is dependent on the gas supply.

Mechanical-based techniques may use screws, hydraulic rams, pumps, or the like to compress or decompress a gas volume or move fluid into and out of a buoyancy chamber. These systems require energy from the vehicle or device to change its buoyancy and are therefore a parasitic drag on its power supply.

Gas generation systems create a gas from a liquid fuel and utilize the gas to displace water in a buoyancy chamber. Like a stored compressed gas system, gas generation systems have limited operational life spans before the supply of liquid fuel is exhausted and buoyancy can no longer be controlled. These types of systems must also store the liquid fuel and gas generation components in addition to a designated chamber, which reduces the volume available for any desired payload.

A need exists, therefore, for buoyancy control systems and methods that overcome the disadvantages of existing techniques.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to an underwater apparatus. The apparatus includes a power source that produces a waste product at least one buoyancy chamber; and a control system configured to direct the waste product to the at least one buoyancy chamber to adjust: at least one of the buoyancy of at least one portion of the underwater apparatus, and the center of buoyancy of the underwater apparatus.

In some embodiments, the control system includes a valve selected from the group consisting of a solenoid valve and a metering flow valve. In some embodiments, the control system further includes a mechanical controller device or an electronic controller device to operate the valve. In some embodiments, the mechanical controller device includes a lever arm and a sliding mass with a compressible float to operate the valve.

In some embodiments, the control system includes at least one pressure sensor to gather pressure data and the control system adjusts the buoyancy of the apparatus based on the pressure data.

In some embodiments, the apparatus further includes an inlet configured to allow a ballast to enter the at least one buoyancy chamber.

In some embodiments, the apparatus further includes an outlet configured to allow a ballast to exit the at least one buoyancy chamber, wherein the ballast includes at least one of water, and aluminum hydroxide generated by the power source.

In some embodiments the power source is an aluminum-water fuel cell.

In some embodiments, the underwater apparatus is an underwater vehicle that includes at least a forward portion with a forward buoyancy chamber and an aft portion with an aft buoyancy chamber.

In some embodiments, the underwater apparatus is selected from the group consisting of a sensing system, an object retrieval system, and a subsurface profiling float.

In some embodiments, the apparatus further includes at least one level sensor device to monitor buoyancy of the at least one portion of the underwater apparatus.

In some embodiments, the apparatus further includes at least one load cell to monitor buoyancy of the at least one portion of the underwater apparatus.

In some embodiments, the at least one buoyancy chamber is configured as an inflatable bladder external to the apparatus.

According to another aspect, embodiments relate to a method of operating an underwater apparatus. The method includes operating a power source that produces a waste product; and directing the waste product to at least one portion of the underwater apparatus to adjust at least one of the buoyancy of the at least one portion of the underwater apparatus and the center of buoyancy of the underwater apparatus.

In some embodiments, the method further includes directing a ballast out of the at least one portion of the underwater apparatus wherein the ballast includes at least one of water, and aluminum hydroxide generated by the power source.

In some embodiments, directing the waste product to the at least one portion includes operating at least one valve to allow the waste product to enter the at least one portion.

In some embodiments, the method further includes directing a ballast into the at least one portion of the underwater apparatus, and directing the waste product out of the at least one portion of the underwater apparatus.

In some embodiments, the method further includes directing a ballast into at least a second portion of the underwater apparatus to adjust the buoyancy of at least the second portion of the underwater apparatus.

In some embodiments, the power source is an aluminum-water fuel cell. In some embodiments, the waste product is hydrogen.

In some embodiments, the method further includes determining the depth of the underwater apparatus, wherein the buoyancy of the underwater apparatus is adjusted based on the depth of the underwater apparatus.

In some embodiments, the method further includes enabling the underwater apparatus to travel to an ocean floor before directing the waste product to at least one portion of the underwater apparatus.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

To overcome the disadvantages of existing techniques, various embodiments described herein may use waste product produced by a fuel cell reaction to operate a safe, depth-tolerant, dynamic buoyancy system. Because buoyancy is controlled using the product of a fuel cell reaction, the vehicle buoyancy can be controlled as long as the vehicle is utilizing the fuel cell. Vehicle altitude and buoyancy are widely controllable due to the magnitude of gas produced by a typical fuel cell. Additionally, the apparatuses and methods described herein are safer and less toxic than existing techniques, such as those based on lead-acid chemistries.

Embodiments of the apparatuses (e.g., vehicles) and methods described herein consume little to no energy to change the vehicle's buoyancy. Additionally, the vehicles and methods described herein require little time to change the vehicle's buoyancy. The amount of energy required may depend on whether the devices that monitor the vehicle's state and operate the valves are electrical and/or mechanical as discussed below.

In some embodiments, the waste product may be hydrogen gas that is produced by an aluminum-seawater fuel cell reaction. In some embodiments, the waste product may be a supercritical fluid. However, other embodiments may use semi-fuel cells or electrodes that may comprise gallium, indium, magnesium, and tin, in addition to aluminum.

Although features of various embodiments are described in conjunction with operating an underwater vehicle, it is contemplated that the configurations, components, and methods described herein may be implemented in other applications. For example, features of various embodiments may be used to fill an external bladder to lift large items from the sea floor.

As another example, the features of the various embodiments described herein may be used in debris sensing and recovery systems. In these embodiments, an apparatus may sink down to some depth, gather objects such as debris, and then adjust its buoyancy accordingly to bring the object to the surface.

In another embodiment, an apparatus may be configured as an ocean-floor device that can be intentionally deployed with a negative buoyancy to sink the bottom of the ocean (or other type of body of water). Then, the apparatus may perform task using the power supplied by a power source such as an aluminum-water fuel cell. After the task is complete, the apparatus may then enter a "recovery" mode and may adjust its buoyancy by dropping the appropriate amount of waste to resurface.

In yet another embodiment, an apparatus may be configured with a mechanical trigger. For example, in some embodiments, the apparatus may be configured with an absolute pressure gauge. Once the device reaches a particular depth, as determined by the pressure measured by the pressure gauge, the apparatus may change its buoyancy to ascend.

In yet another embodiment, an apparatus may be configured with at least two absolute pressure sensors. In these types of embodiments, the apparatus may use data from two or more absolute pressure sensors to "float" or otherwise stay within a certain depth range.

In another embodiment, an apparatus may use data from an external sensor. For example, an apparatus may include a body portion and a tail portion extending from the body portion, where the body portion and the tail portion are each configured with a pressure sensor. The tail portion may be a rigid or long line with a sensor thereon, and the apparatus may use a control loop that considers data from both sensors. The tail portion may even directly connect to another vehicle (e.g., if the tail portion is configured with a grappling hook or a magnet). In this embodiment, the difference between the two pressure readings (i.e., a differential) may be used as an input to a control system to control the apparatus.

Figure 1:
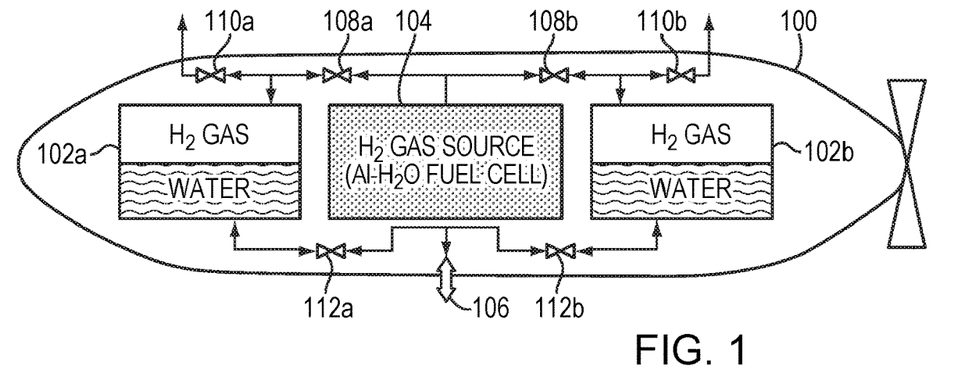
FIG. 1 illustrates an underwater vehicle achieving a neutral buoyancy in accordance with one embodiment.

FIG. 1 illustrates an underwater vehicle 100 in accordance with one embodiment. The vehicle 100 may include a forward buoyancy chamber 102a and an aft buoyancy chamber 102b. This two-chamber configuration permits the adjustment of the vehicle's trim and can be used to create pitch motion in addition to vertical displacement available from, for example, filling or flushing both chambers at the same time.

Although FIG. 1 illustrates the vehicle 100 as including two chambers 102a and 102b, it is contemplated that the vehicle 100 may include any number of buoyancy chambers. Having more buoyancy chambers may increase the level of buoyancy control.

In some embodiments, the chambers 102a and 102b may be configured as bladders. For example, the bladders may be made of any suitable material as long as it can hold a ballast (e.g., seawater) and/or gas to accomplish the features of various embodiments described herein.

The chambers 102a and 102b may be operably connected to a gas source 104. The gas source 104 may be configured as a fuel cell and may supply gas to fill some or both chambers 102a and 102b to adjust the vehicle's buoyancy as desired.

As seen in FIG. 1, the gas source 104 may be an aluminum-seawater fuel cell that provides hydrogen gas as a waste product when producing electricity. However, in other embodiments the gas source 104 may be configured as other devices that vent hydrogen or another gas while producing electricity or one or more fuel cells utilizing different chemistries to produce electricity.

During operation, the hydrogen flow rate should be to proportional the amount of electrical energy consumed by the vehicle 100. For periods in which a quick transition is required, the gas source 104 may operate in a mode to produce gas quickly. Accordingly, the amount of gas produced will dictate the rate at which the buoyancy of the vehicle 100 can be changed.

The vehicle 100 may further include one or more inlet/outlets 106 to allow a ready source of ballast (e.g., seawater, and/or aluminum hydroxide that is generated by a chemical reaction) to enter the vehicle 100 and, more specifically, to enter the chambers 102a and/or 102b. Additionally, the inlet/outlet 106 may act as an outlet and flush the ballast when the chambers 102a and 102b are filled with gas from the gas source 104.

The vehicle 100 may include a plurality of valves to control the flow of gas and the ballast. For example, in some embodiments, the valves may be solenoid valves with an orifice or metering flow valves to control how quickly water enters and/or exits a chamber. As discussed below, the valves may be controlled by a controller device that may send control signals to open/close certain valves.

Additionally, the vehicle's buoyancy may be monitored using, e.g., level sensors and/or load cells that support the buoyancy chambers. Once the desired trim is achieved as determined by data gathered by said sensors, the appropriate valves may be opened or closed.

Based on which valves are open or closed, the buoyancy at each end of the vehicle 100 may be adjusted. This in turn affects the total buoyancy, center of buoyancy, and/or trim of the vehicle 100.

In operation, valves 108a and 108b provide a path to fill chambers 102a and 102b, respectively, with gas from the gas source 104. If valve 108b is closed and valve 108a is open, gas will only enter the chamber 102a.

In other words, valve 108a allows the forward chamber 102a to be filled, and valve 108b allows the aft chamber 102b to be filled. When valve 108a or 108b is open, the corresponding valve (i.e., 112a or 112b) is typically open as well to permit the gas to displace the ballast from the corresponding buoyancy chamber. Once the ballast is forced out of the chamber, it may be then flushed through the inlet/outlet 106 into the ambient environment (e.g., an ocean).

To flush gas, valves 110a and 110b can be opened to vent gas from the corresponding chamber into the environment. When valve 110a or 110b is open, the corresponding valve (i.e., 112a or 112b) is typically opened as well to permit seawater to enter the corresponding chamber from the ambient environment.

FIG. 1 shows the vehicle 100 with a neutral buoyancy and trim. In operation, the hydrogen gas may provide positive buoyancy, and the mass of the fuel cell and the apparatus provides negative buoyancy.

In FIG. 1, each chamber 102a and 102b has the same buoyancy relative to each other. In this state, the valves 108a, 108b, 110b, and 112b are closed and valves 110a and 112a are opened. This permits gas from the gas source 104 to vent into the environment instead of into the chamber 102a.

Figure 2:
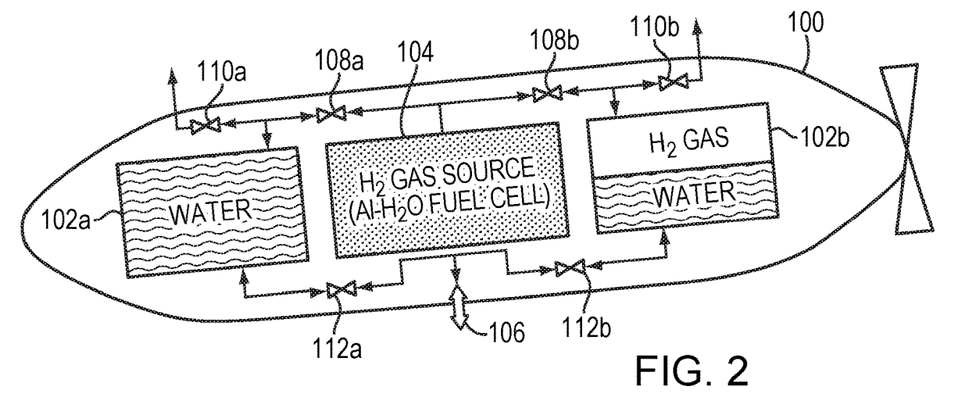
FIG. 2 illustrates the underwater vehicle of FIG. 1 achieving a negative buoyancy in accordance with one embodiment.

Certain valves may be opened or closed to adjust the trim and buoyancy of the vehicle 100. For example, FIG. 2 shows the vehicle 100 of FIG. 1 with a negative buoyancy and a diving trim. This can be achieved by closing valves 108a, 108b, 110b, and 112b, and having valves 110a and 112a open.

Figure 3:
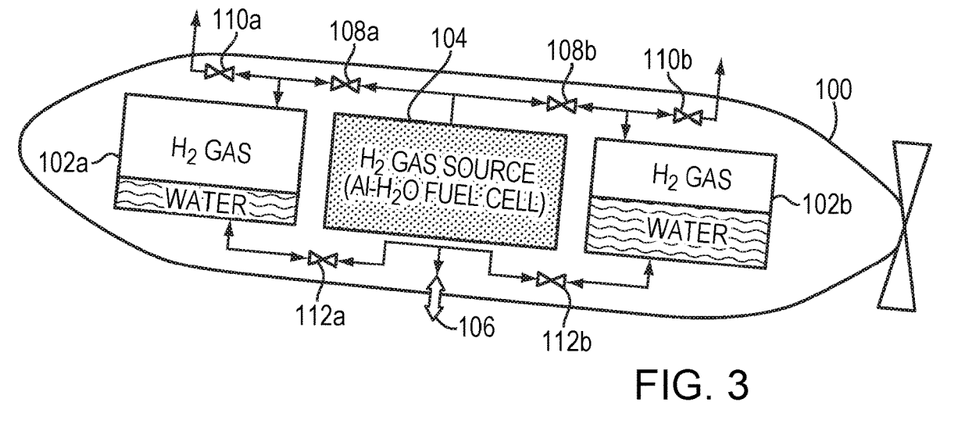
FIG. 3 illustrates the underwater vehicle of FIGS. 1 and 2 achieving a positive buoyancy.

As another example, FIG. 3 shows the vehicle 100 of FIGS. 1 and 2 with a positive buoyancy and an ascending trim. This can be achieved by closing valves 108b, 110a, 110b, and 114b and opening valves 108a and 112a. Gas is therefore routed from the gas source 104 to the chamber 102a, and the ballast (i.e., water) is flushed through open valve 112a and out of the inlet/outlet 106.

Accordingly, filling one of the chambers 102a or 102b with gas allows the vehicle 100 to have a positive, neutral, or negative trim. Filling forward chamber 102a with more gas than in aft chamber 102b gives the vehicle 100 a positive trim. On the other hand, filling aft chamber 102b with more gas than the forward chamber 102a gives the vehicle 100 a negative trim. Filling both chambers 102a and 102b with an equal amount of gas gives the vehicle 100 a neutral trim.

Figure 4:
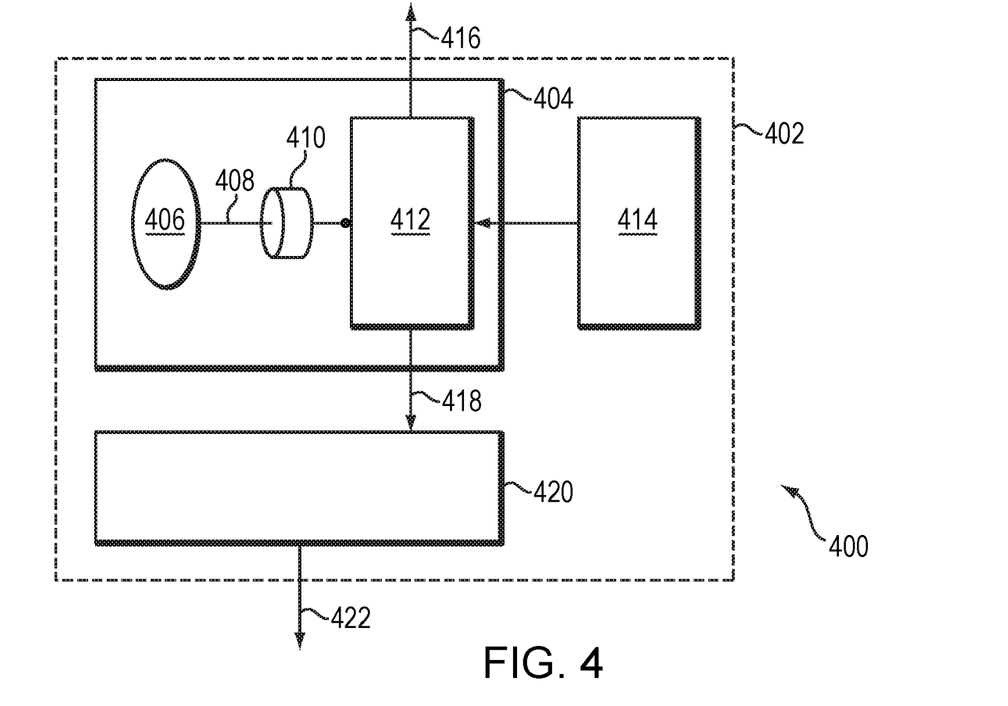
FIG. 4 illustrates a schematic of components of an underwater vehicle in accordance with one embodiment.

FIG. 4 illustrates a schematic 400 of the mechanical controller components of an apparatus 402 (which may be similar to the vehicle 100 of FIGS. 1-3) in accordance with one embodiment. In this embodiment, the components are used to perform the tasks of descending to a certain depth and later ascending to the surface.

The apparatus 402 may include a chamber 404 with a compressible, fluid-filled bladder 406, a lever arm 408, a sliding mass 410, and a valve 412. The chamber 404 may be operably connected to gas source 414 such as an Al—H₂O cell. The apparatus 402 may further include a gas vent 416, a gas line 418 to a second buoyancy chamber 420, and an inlet/gas vent 422.

In this embodiment, the apparatus 402 may descend by achieving minimum buoyancy. The bladder 406 is in the "up" position and the mass 410 has slid down the lever arm 408 to exert minimum force on the bladder 406. The valve 412 may be a two-position valve and may allow flow between all through ports. This allows gas to escape through the vent 416 and allows ambient water to fill the buoyancy chamber 420.

The apparatus 402 may then ascend by achieving maximum buoyancy. In this scenario, the gas vent 416 is closed so that ambient pressure compresses the bladder 406 such that it is no longer buoyant. Then, gas fills the buoyancy chamber 420 and forces out any water therein. Additionally, the sliding mass 410 may move to a position near the bladder 406. This increases the force required to lift the lever arm 408 by the bladder 406. In summary, the point at which the apparatus 402 transitions between ascent and descent is determined by the compressibility of the gas/fluid in the bladder 406, the mass 410, and the distance the sliding mass 410 slides on the lever arm 408.

The combination of the various mechanical components of FIG. 4 may be referred to as an oscillating depth control device. In some embodiments, more than one oscillating depth control devices may be placed in the fore and the aft of the apparatus 402 to control buoyancy. The respective size of the chambers and actuating depths may determine the attitude of the apparatus 402. Both chambers may be driven by the same gas supply line as well.

In some embodiments, the apparatus may be configured to autonomously descend to a pre-programmed depth. Once at the pre-programmed depth (or at the pre-programmed depth for a period of time), the apparatus may ascend.

Figure 5:
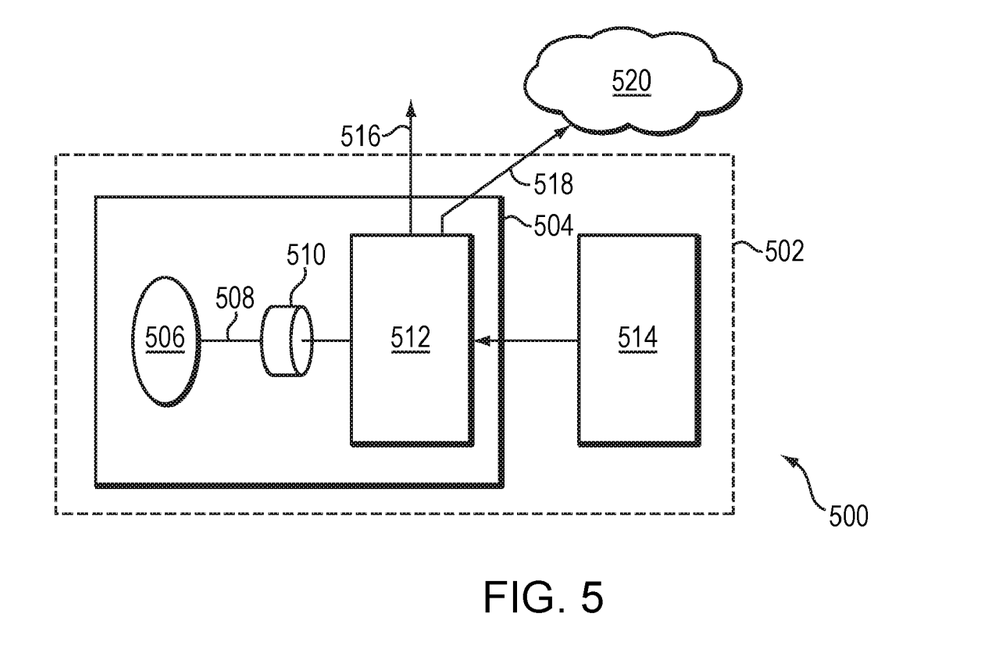
FIG. 5 illustrates a schematic of components of an underwater vehicle in accordance with another embodiment.

FIG. 5 illustrates a schematic 500 of mechanical controller components of an apparatus 502 in accordance with this type of embodiment. In this embodiment, the apparatus 502 may include a chamber 504 with a compressible fluid-filled bladder 506 with a determined mass, a lever arm 508, a sliding mass 510, and a valve 512 operably connected with the gas source (e.g., an Al—H₂O cell) 514. The apparatus 502 may further include a gas vent 516 to the environment outside of the apparatus 502, and a gas line 518 to a buoyancy bladder 520 external to the apparatus 502.

The apparatus 502 may operate similarly to the apparatus 402 of FIG. 4. However, as stated previously, the apparatus 502 only descends to a pre-programmed depth and then ascends.

In operation, the buoyancy bladder 520 starts evacuated or otherwise empty. The apparatus 502 may begin its descent to a predetermined depth. Once at the depth as determined by techniques discussed below and other techniques known in the art, the valve 512 may open to enable gas from the source 514 to flow into the bladder 520. The bladder 520 may then inflate and the apparatus 502 may ascend.

Figure 6:
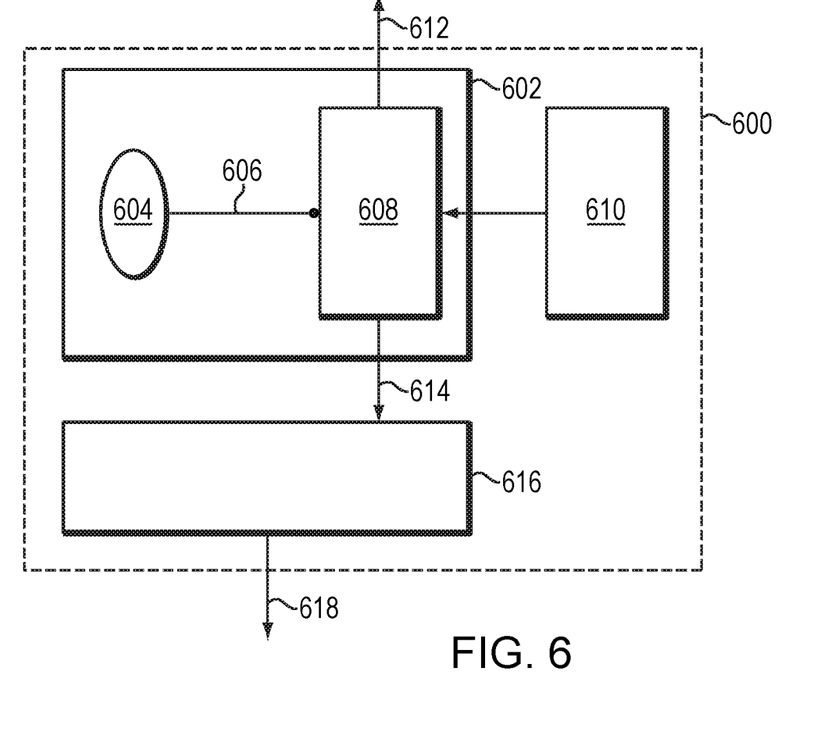
FIG. 6 illustrates a schematic of components of an underwater vehicle in accordance with still another embodiment.

FIG. 6 illustrates an apparatus 600 in accordance with yet another embodiment. In this embodiment, the apparatus 600 may include a chamber 602 that can be filled with ambient water. The chamber 602 may include a compressible fluid-filled bladder 604 with a determined mass, a lever arm 606, and a valve 608 that is operably connected to a gas source 610 such as an Al—H₂O cell.

The chamber 602 may further include gas vent 612 and a gas line 614 to a second buoyancy chamber 616. The buoyancy chamber 616 may further be configured with an H₂O inlet/gas vent 618.

The apparatus 600 of FIG. 6 may be configured to maintain a constant depth. In operation, the bladder 604 may be such that the combination of mass and compressibility results in a buoyancy transition at the desired depth.

To descend to a desired depth, the valve 608 may shut the port connecting the gas source 610 to the second buoyancy chamber 616 which allows the second buoyancy chamber 616 to be filled with ambient water. Once the apparatus 600 is at the desired depth, the bladder 604 will sink in the chamber 602 and close the gas vent 612. This forces gas into the second buoyancy chamber 616 and forces the fluid out of the second buoyancy chamber 616. At this stage, the apparatus 600 may oscillate around the desired depth as the bladder 604 becomes positively/negatively buoyant.

Figure 7:
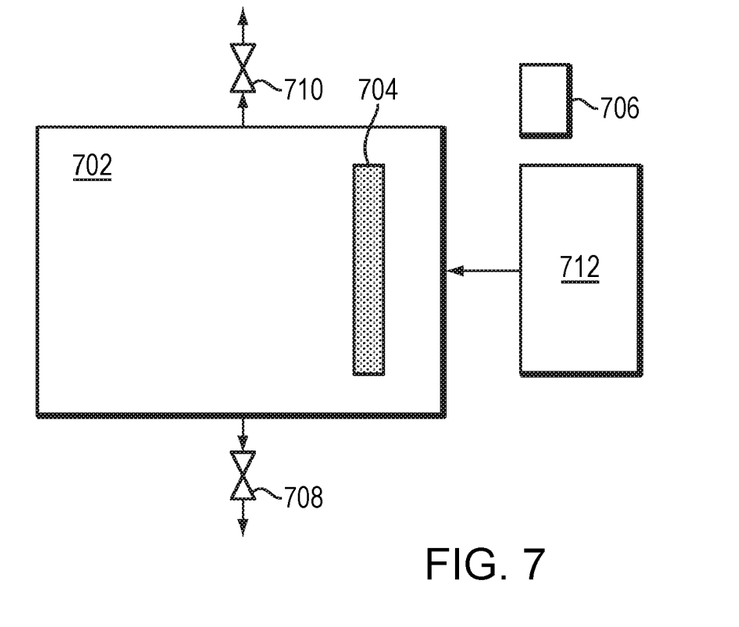
FIG. 7 illustrates a buoyancy chamber configured with a level sensor in accordance with one embodiment.

As mentioned previously, the apparatuses of various embodiments may include one or more control components and sensors to control its operation. FIG. 7 illustrates a chamber 702 using electronic controller components such as a sensor 704 in accordance with one embodiment.

The chamber 702 may be similar to the chambers 102a and 102b of FIGS. 1-3. The chamber 702 may include or otherwise may be connected with a level sensor 704 and a microcontroller 706. The chamber 702 may also be connected to a lower vent valve 708 and an upper vent valve 710. As in other embodiments, the chamber 702 may receive gas from a gas source 712 such as an Al—H₂O cell.

In operation, the level sensor 704 may measure the level of a liquid (e.g., seawater) in the chamber 702 and communicate the measurements to the microcontroller 706. The microcontroller 706 may then operate the lower and upper vent valves 708, 710, respectively, to increase, decrease, or maintain a certain liquid level in the buoyancy chamber 602.

The vehicles and devices in accordance with various embodiments may include multiple sensors such as the sensor 704. For example, each chamber, and the amount of liquid therein, may be measured by a separate sensor and controlled by a separate microcontroller. Sensors such as sensors 704 may be configured with the vehicle 100 of FIGS. 1-3, for example.

Figure 8:
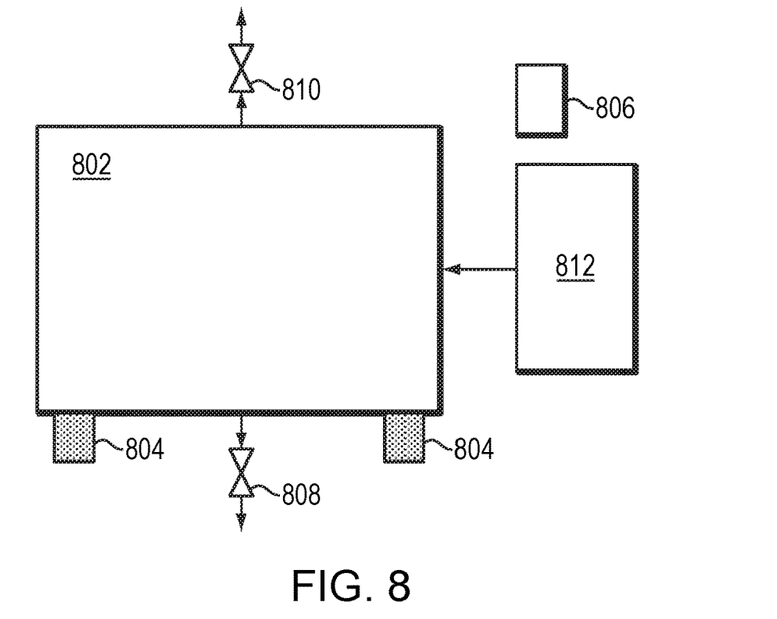
FIG. 8 illustrates a buoyancy chamber configured with a load cell in accordance with one embodiment.

In addition to or in lieu of level sensors, the vehicles and devices in accordance with various embodiments may also include one or more load cells. FIG. 8 illustrates a chamber 802 such as the chambers 102a and 102b of FIGS. 1-3. In this embodiment, the chamber 802 may be operably configured with load cells 804 that measure tension/compression. Similar to the chamber 702 of FIG. 7, the chamber 802 may include or otherwise be connected with a microcontroller 806, a lower vent valve 808, and an upper vent valve 810. As in other embodiments, the chamber 802 may receive gas from a power source 812 such as an Al—H₂O cell venting hydrogen.

In operation, the load cell(s) 804 may measure the buoyancy of the chamber 802 and communicate the measured data to the microcontroller 806. The microcontroller 806 may then send control signals to open/close the valves 808 and 810 to increase, decrease, or maintain the level of liquid in the buoyancy chamber 802 to achieve the desired buoyancy. Load cells such as load cells 804 may be configured with the vehicle 100 of FIGS. 1-3, for example.

Additionally, the apparatuses of various embodiments may include any type of pressure sensor(s) to gather pressure data from which the apparatus's depth can be determined. This knowledge can be leveraged to control the apparatus's operation.

For example, apparatuses may include pressure sensors to detect when the apparatus as a certain depth at which point the vehicle may adjust its buoyancy (e.g., to ascend). Or, in some embodiments, the apparatus may include multiple pressure sensors to stay within a certain depth range.

Figure 9:
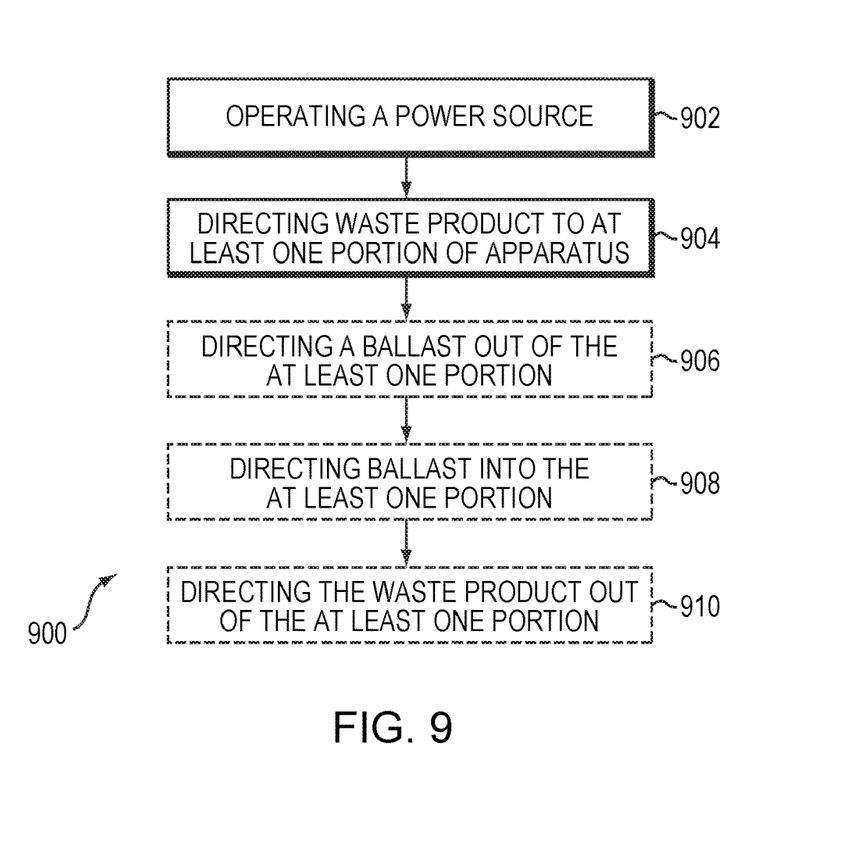
FIG. 9 depicts a flowchart of a method of operating an underwater apparatus in accordance with one embodiment.

FIG. 9 depicts a flowchart of a method 900 of operating an underwater apparatus in accordance with one embodiment. The underwater apparatus may be a sensing system, a profiling float, or other type of underwater apparatus.

Step 902 involves operating a power source that produces a waste product. The power source may be, for example, an aluminum-water fuel cell (in which case the waste product is hydrogen), semi-fuel cells, or electrodes comprising gallium, indium, magnesium, and tin in addition to aluminum. The exact type of waste product will of course depend on the type of power source.

The power source may supply power to other components of the underwater apparatus so the apparatus can operate as intended. However, step 904 involves directing the waste product to at least one portion of the underwater apparatus to adjust at least one of the buoyancy of the at least one portion of the underwater apparatus and the center of buoyancy of the underwater apparatus.

The waste product generated from the power source operation may be forced into a portion of the apparatus such as a designated chamber by a series of valves and connections. As the waste product enters the portion(s), the portion(s) become more buoyant and therefore change the buoyancy of the apparatus, the center of buoyancy of the apparatus, and/or the trim of the apparatus.

Step 906 involves directing a ballast out of the at least one portion of the underwater apparatus. As the waste product enters a portion of the apparatus, a ballast (e.g., water) that is in the portion may be forced out of the portion. Accordingly, this changes the buoyancy of the apparatus, the center of buoyancy of the apparatus, and/or the trim of the apparatus.

Step 908 involves directing a ballast into the at least one portion of the underwater apparatus. As discussed above, the ballast may be seawater and may be directed into a certain portion of the apparatus to make that portion of the apparatus less buoyant (e.g., if the apparatus or a portion of the apparatus is supposed to descend). Accordingly, this changes the buoyancy of the apparatus, the center of buoyancy of apparatus, and/or the trim of the apparatus.

It is also noted that the ballast may be transferred between portions of the apparatus, rather than just pulled in from the ambient environment. For example, the ballast directed out of the portion in step 906 may be channeled to another portion of the apparatus by an optimal configuration valves and connections.

Step 910 involves directing the waste product out of the at least one portion of the underwater apparatus. As the ballast enters the portion, the waste product (e.g., gas) is forced out of the portion. Accordingly, this changes the buoyancy of the apparatus, the center of buoyancy of apparatus, and/or the trim of the apparatus.

The embodiments discussed above merely exemplary embodiments and it is contemplated that the apparatuses described herein may be arranged in a number of configurations. For example, an apparatus may include a single or many buoyancy chambers or bladders and rely on control strategies that utilize mechanical systems or electrical valves; level sensors or load cells. Additionally, the chambers may include both level sensors and load cells to measure system status. The apparatuses may also include alternate routings of hydrogen from the fuel cell(s), alternate routing of water to the buoyancy chamber(s) etc.

Additionally, the apparatuses and methods of various embodiments described herein may work in conjunction with mechanical control or implementation systems. In other words, any sort of mechanical control system on or otherwise within the apparatus may work in parallel with the dynamic buoyancy components and techniques described herein.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. An underwater apparatus, the apparatus comprising:
    a power source that produces a gaseous waste product;
    a forward buoyancy chamber and an aft buoyancy chamber, wherein the forward buoyancy chamber and the aft buoyancy chamber are configured to adjust a trim of the underwater apparatus; and
    a control system configured to direct the gaseous waste product and a ballast into the forward buoyancy chamber and the aft buoyancy chamber to adjust
    the center of buoyancy of the underwater apparatus,
    wherein when the forward buoyancy chamber and the aft buoyancy chamber comprise equal amounts of the gaseous waste product and the ballast, the underwater apparatus is under a neutral trim;
    wherein when the forward buoyancy chamber comprises more gaseous waste product than the aft buoyancy chamber, the underwater apparatus is under a positive trim;
    wherein when the aft buoyancy chamber comprises more gaseous waste product than the forward buoyancy chamber, the underwater apparatus is under a negative trim; and
    wherein the trim and the buoyancy of the underwater apparatus are independently configurable.

2. The underwater apparatus of claim 1 wherein the control system includes a valve selected from the group consisting of a solenoid valve and a metering flow valve.

3. The underwater apparatus of claim 2 wherein the control system further includes a mechanical controller device to operate the metering flow valve or an electronic controller device to operate the solenoid valve.

4. The underwater apparatus of claim 1 wherein the control system includes at least one pressure sensor to gather pressure data and the control system adjusts the buoyancy of the apparatus based on the pressure data.

5. The underwater apparatus of claim 1 further comprising an inlet configured to allow a ballast to enter the at least one buoyancy chamber, wherein the ballast includes at least one of water, and aluminum hydroxide generated by the power source.

6. The underwater apparatus of claim 1 further comprising an outlet configured to allow a ballast to exit the at least one buoyancy chamber, wherein the ballast includes at least one of water, and aluminum hydroxide generated by the power source.

7. The underwater apparatus 1 wherein the power source is an aluminum-water fuel cell.

8. The underwater apparatus of claim 1 wherein the underwater apparatus is an underwater vehicle that includes at least a forward portion with a forward buoyancy chamber and an aft portion with an aft buoyancy chamber.

9. The underwater apparatus of claim 1 wherein the underwater apparatus is selected from the group consisting of a sensing system, an object retrieval system, and a subsurface profiling float.

10. The underwater apparatus of claim 1 further comprising at least one level sensor device to monitor buoyancy of the at least one portion of the underwater apparatus.

11. The underwater apparatus of claim 1 further comprising at least one load cell to monitor buoyancy of the at least one portion of the underwater apparatus.

12. The underwater apparatus of claim 1 wherein the at least one buoyancy chamber is configured as an inflatable bladder external to the apparatus.

13. A method of operating an underwater apparatus, the method comprising:
    operating a power source that produces a gaseous waste product; and
    directing the gaseous waste product and a ballast to a forward buoyancy chamber and an aft buoyancy chamber of the underwater apparatus to adjust the center of buoyancy of the underwater apparatus,
    wherein when the forward buoyancy chamber and the aft buoyancy chamber comprise equal amounts of the gaseous waste product and the ballast, the underwater apparatus is under a neutral trim;
    wherein when the forward buoyancy chamber comprises more gaseous waste product than the aft buoyancy chamber, the underwater apparatus is under positive trim,
    wherein when the aft buoyancy chamber comprises more gaseous waste product than the forward buoyancy chamber, the underwater apparatus is under negative trim; and
    wherein the trim and the buoyancy of the underwater apparatus are independently configurable.

14. The method of claim 13 further comprising directing a ballast out of the at least one portion of the underwater apparatus, wherein the ballast includes at least one of water, and aluminum hydroxide generated by the power source.

15. The method of claim 13 wherein directing the waste product to the at least one portion includes operating at least one valve to allow the waste product to enter the at least one portion.

16. The method of claim 13 further comprising:
    directing a ballast into the at least one portion of the underwater apparatus, and
    directing the waste product out of the at least one portion of the underwater apparatus.

17. The method of claim 13 further comprising directing a ballast into at least a second portion of the underwater apparatus to adjust the buoyancy of at least the second portion of the underwater apparatus.

18. The method of claim 13 wherein the power source is an aluminum-water fuel cell.

19. The method of claim 17 further comprising determining the depth of the underwater apparatus, wherein the buoyancy of the underwater apparatus is adjusted based on the depth of the underwater apparatus.

20. The method of claim 13 further comprising enabling the underwater apparatus to travel to an ocean floor before directing the waste product to at least one portion of the underwater apparatus.

* * * * *